Dec. 1, 1936.  H. GOLDEN  2,062,748

GUARD FOR LEVER OPENINGS

Filed July 6, 1936

INVENTOR
HARRY GOLDEN
BY
C. James Cottrell
ATTORNEY

Patented Dec. 1, 1936

2,062,748

UNITED STATES PATENT OFFICE 2,062,748

GUARD FOR LEVER OPENINGS

Harry Golden, New York, N. Y., assignor to Magna Products Corp., a corporation of New York Application July 6, 1936, Serial No. 89,221

2 Claims. (Cl. 74—566)

This invention relates to improvements in guards for lever openings such as occur in automobiles.

Heretofore, guards for openings such as surround gear shift levers on automobiles have comprised a rubber boot which is fitted around the lever near the base thereof and over the opening through the floor boards. Such guards however, have been found objectionable in that it is necessary to remove the knob from the gear shift lever before the guard can be fitted thereover; and also such guards collapse and do not fit tightly about the lever after a short period of use.

It is, therefore, an object of this invention to provide a guard for a gear shift lever opening which can be passed over the knob of a gear shift lever.

A further object is the provision of a guard for lever openings having the main body thereof reinforced to prevent collapsing.

These and other objects are attained by the novel construction, combination and arrangement of parts hereinafter described and shown in the accompanying drawing, constituting a material part of this disclosure, and in which.

Figure 1:
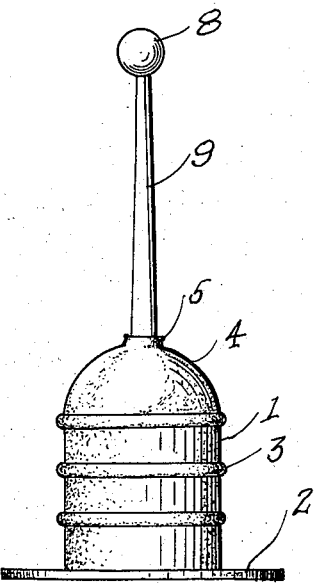
Fig. 1 is an elevational view of a guard for a gear shift lever embodying my invention.
Figure 2:
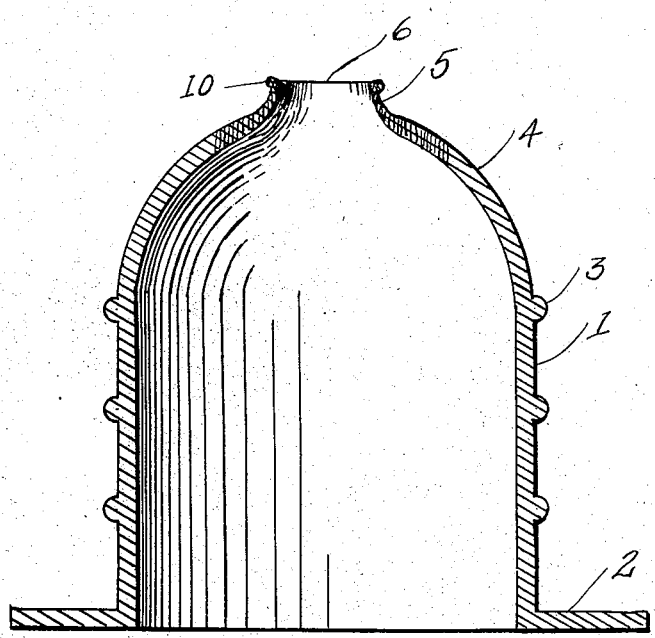
Fig. 2 is a cross-sectional view of the guard for lever opening.

Referring to to the drawing, my guard for lever opening is shown to comprise a main body 1 which is preferably cylindrical and has a right angled peripheral flange 2 at the bottom thereof. The main body is preferably made of rubber or a similar flexible and elastic material; and the main body 1 has a plurality of vertically spaced ribs 3 encircling it, the ribs 3 reinforcing the main body 1 and prevents it from collapsing. The main body is curved at 4 at the upper end thereof, and provided with an opening 6, through which the knob 8 of a gear shift lever 9 can be passed. In order that the knob 8 can easily pass through the opening 6, the rubber or other material surrounding the opening and designated by cross hatching at 5 on the drawing, is thinned out and especially treated to provide greater elasticity than the main body 1 of the guard, so that the opening 6 can be enlarged sufficiently to receive the knob 8.

After the guard has been passed over the knob, the elastic rubber 5 tightly grips the lever 9 and to strengthen this portion of the guard and prevent collapsing after a period of use, the opening 6 is surrounded by a bead 10.

From the above description it will be seen that I have provided a simple and effective guard for lever openings, which will not collapse after use and which can be readily and conveniently passed over knobs on levers.

The foregoing disclosure is to be regarded as descriptive and illustrative only, and not as restrictive or limitative of the invention, of which obviously an embodiment may be constructed including modifications without departing from the general scope herein indicated and denoted in the appended claims.

Having thus described my invention, what I claim as new and desire to secure by Letters Patent is:—

1. A guard for lever openings comprising a main body having a plurality of circumferential spaced ribs and a right angled flange at the base thereof, said main body being formed of an elastic material and having an opening in the upper part thereof, the material surrounding the opening being thinner than the main body and having greater elasticity; and a bead surrounding said opening.

2. A guard for lever openings, comprising a main body having a plurality of circumferential spaced ribs and a flange at the base thereof, said main body having an opening in the upper part thereof, the material surrounding the opening having sufficient elasticity to enable the guard to be passed over the knob of a gear shift lever.

HARRY GOLDEN.